United States Patent
Moreton et al.

(10) Patent No.: US 12,328,316 B2
(45) Date of Patent: Jun. 10, 2025

(54) SYSTEMS AND METHODS FOR MANAGING ELECTRONIC TRANSACTIONS USING ELECTRONIC TOKENS AND TOKENIZED VEHICLES

(71) Applicant: Capital One Services, LLC, McLean, VA (US)

(72) Inventors: Paul Moreton, Glen Allen, VA (US); Lawrence Douglas, McLean, VA (US); Thomas Poole, Chantilly, VA (US); Thomas Christopher Clarke, Alexandria, VA (US); Saejin Choi, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 451 days.

(21) Appl. No.: 17/186,596

(22) Filed: Feb. 26, 2021

(65) Prior Publication Data
US 2021/0185049 A1 Jun. 17, 2021

Related U.S. Application Data

(63) Continuation of application No. 15/491,393, filed on Apr. 19, 2017, now Pat. No. 10,965,682, which is a (Continued)

(51) Int. Cl.
*H04L 9/40* (2022.01)
*G06F 21/41* (2013.01)
(Continued)

(52) U.S. Cl.
CPC ............ *H04L 63/102* (2013.01); *G06F 21/41* (2013.01); *G06F 21/6245* (2013.01);
(Continued)

(58) Field of Classification Search
CPC .......................... H04L 63/123; H04L 63/126
See application file for complete search history.

(56) References Cited

U.S. PATENT DOCUMENTS 8,370,264 B1 * 2/2013 Wei ......................... G06Q 20/12
705/76
8,935,802 B1 * 1/2015 Mattsson ............ G06F 21/6254
726/26

(Continued)

FOREIGN PATENT DOCUMENTS

WO WO 2015/088638 6/2015

*Primary Examiner* — Harris C Wang
(74) *Attorney, Agent, or Firm* — Foley & Lardner LLP

(57) ABSTRACT

Systems and methods are provided for managing electronic tokens associated with an account. A system may include a memory storing instructions and account information associated with an account, and a processor configured to executed the stored instructions to: access information associated with one or more electronic tokens associated with the account, wherein the information includes one or more token settings, receive, via a network, information for a transaction request including a first token; analyze the received information to determine whether at least one rule in the one or more token settings is violated, responsive to a determination that at least one rule is violated, transmit an indication that the transaction request is denied, and responsive to a determination that no rules are violated, detokenize the transaction request.

17 Claims, 9 Drawing Sheets

Related U.S. Application Data continuation of application No. 15/186,065, filed on Jun. 17, 2016, now Pat. No. 10,505,940.

(60) Provisional application No. 62/324,505, filed on Apr. 19, 2016, provisional application No. 62/181,962, filed on Jun. 19, 2015.

(51) Int. Cl.
| | | |
|---|---|---|
| *G06F 21/62* | (2013.01) | |
| *G06F 21/88* | (2013.01) | |
| *G06Q 20/38* | (2012.01) | |
| *H04W 12/08* | (2021.01) | |
| *H04W 12/30* | (2021.01) | |

(52) U.S. Cl.
CPC ......... *G06F 21/88* (2013.01); *G06Q 20/3821* (2013.01); *H04L 63/123* (2013.01); *H04L 63/126* (2013.01); *H04W 12/08* (2013.01); *H04W 12/35* (2021.01)

(56) References Cited

U.S. PATENT DOCUMENTS

| | | | |
|---|---|---|---|
| 9,038,157 B1 | 5/2015 | Santiago, Jr. et al. | |
| 11,132,694 B2* | 9/2021 | Mercille | H04W 12/06 |
| 2003/0208684 A1 | 11/2003 | Camacho et al. | |
| 2010/0235284 A1* | 9/2010 | Moore | G06Q 20/401 |
| | | | 709/204 |
| 2012/0316992 A1* | 12/2012 | Oborne | G06Q 20/384 |
| | | | 705/26.41 |
| 2013/0238455 A1 | 9/2013 | Laracey | |
| 2013/0290121 A1 | 10/2013 | Simakov et al. | |
| 2013/0332344 A1* | 12/2013 | Weber | G06Q 20/385 |
| | | | 705/39 |
| 2014/0032410 A1* | 1/2014 | Georgiev | G06Q 20/405 |
| | | | 705/44 |
| 2014/0032415 A1 | 1/2014 | Lee et al. | |
| 2015/0032627 A1 | 1/2015 | Dill et al. | |
| 2015/0046338 A1* | 2/2015 | Laxminarayanan | |
| | | | G06Q 20/38215 |
| | | | 705/67 |
| 2015/0100495 A1* | 4/2015 | Salama | G06Q 20/405 |
| | | | 705/65 |
| 2015/0106239 A1* | 4/2015 | Gaddam | G06Q 20/40 |
| | | | 705/26.82 |
| 2015/0180836 A1* | 6/2015 | Wong | G06Q 20/3672 |
| | | | 713/172 |
| 2015/0195133 A1* | 7/2015 | Sheets | H04W 4/50 |
| | | | 709/222 |
| 2015/0254638 A1* | 9/2015 | Bondesen | G06Q 20/36 |
| | | | 705/41 |
| 2015/0254641 A1 | 9/2015 | Bondesen et al. | |
| 2015/0254665 A1* | 9/2015 | Bondesen | G06Q 20/367 |
| | | | 705/44 |
| 2015/0350177 A1* | 12/2015 | Sharp | G06Q 20/321 |
| | | | 726/6 |
| 2016/0092696 A1* | 3/2016 | Guglani | G06F 21/606 |
| | | | 726/26 |
| 2016/0119296 A1* | 4/2016 | Laxminarayanan | H04L 9/0822 |
| | | | 713/168 |
| 2016/0148197 A1* | 5/2016 | Dimmick | G06Q 20/32 |
| | | | 705/67 |
| 2016/0162885 A1* | 6/2016 | Bondesen | G06Q 20/3821 |
| | | | 705/66 |
| 2016/0171479 A1* | 6/2016 | Prakash | G06Q 20/3226 |
| | | | 726/1 |
| 2016/0189136 A1* | 6/2016 | Mercille | H04W 12/06 |
| | | | 705/44 |
| 2016/0373458 A1* | 12/2016 | Moreton | H04L 63/126 |

* cited by examiner

SYSTEMS AND METHODS FOR MANAGING ELECTRONIC TRANSACTIONS USING ELECTRONIC TOKENS AND TOKENIZED VEHICLES

PRIORITY CLAIM

This application is a continuation of U.S. patent application Ser. No. 15/491,393, filed on Apr. 19, 2017, which is a continuation of U.S. patent application Ser. No. 15/186,065, filed Jun. 17, 2016, which claims the benefit of U.S. Provisional Application No. 62/181,962, filed Jun. 19, 2015 and U.S. Provisional Application No. 62/324,505, filed Apr. 19, 2016, all of which are hereby incorporated by reference in their entirety.

BACKGROUND

The Internet of Things has rapidly expanded into nearly all facets of daily life. Recently, electronic devices have begun transmitting account information, replacing traditional plastic cards with magnetic stripes. For example, many organizations now use near field communication and wireless transceivers to receive account information from smart phones, to conduct payment transactions, grant access to secure areas, or identify an individual associated with the smartphone. Generally, the smartphone transmits the account information or a randomly-generated number to complete a transaction.

Current systems include security measures to protect from fraud or theft, if the smartphone is stolen or lost. But when an electronic device or traditional card is lost or compromised, the account issuer must close the account, open a new account, and issue a new account number to prevent fraud or identity theft. In the meantime, fraudulent activity can occur when an unauthorized individual has the actual account information. Once the issuer closes the account, a new account is opened with new sensitive account information.

In view of the shortcomings of current systems, an improved system and method for controlling and communicating account information is desired.

SUMMARY

Disclosed embodiments provide systems and methods for managing electronic transactions using electronic tokens and tokenized devices.

Consistent with a disclosed embodiment, a system for managing electronic tokens associated with an account is provided. The system may include a memory storing instructions and account information associated with an account; and a processor configured to executed the stored instructions to: access information associated with one or more electronic tokens associated with the account, wherein the information includes one or more token settings; receive, via a network, information for a transaction request including a first token; analyze the received information to determine whether at least one rule in the one or more token settings is violated; responsive to a determination that at least one rule is violated, transmit an indication that the transaction request is denied; and responsive to a determination that no rules are violated, detokenize the transaction request.

Consistent with another disclosed embodiment, a method for managing electronic tokens associated with an account is provide. The method may include accessing, by at least one processor, information associated with one or more electronic tokens associated with the account, wherein the information includes one or more token settings; receiving, by the at least one processor via a network, information for a transaction request including a first token; analyzing, by the at least one processor, the received information to determine whether at least one rule in the one or more token settings is violated; responsive to a determination that at least one rule is violated, transmitting an indication that the transaction request is denied; and responsive to a determination that no rules are violated, detokenizing the transaction request.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Systems and methods are provided for creating and managing electronic tokens for account transaction devices. In some embodiments, tokens are created and provisioned to a particular electronic device, so that the token will only work if transmitted from the provisioned electronic device. In some embodiments, tokens are provisioned to a particular web browser application on a particular computer terminal, so that the token will only work when communicated through the provisioned browser of the provisioned terminal. In all embodiments, the tokens are different than the account information itself, so that if a token is compromised, sensitive account information is not compromised with the stolen token. For example, when the account information is a 16 digit number, a token may include a different number (e.g., different characters and/or length) that is associated with the account information. Thus, tokens can be cancelled, created, and managed without affecting the original account information.

In some embodiments, a unified graphical user interface control panel is provided for managing issued tokens for all account transaction devices for one or more accounts. The control panel may include one or more selectable elements, such as switches, for dynamically enabling and disabling tokens for an account that are provisioned to one or more electronic devices and/or one or more computer terminal applications such as web browsers. The control panel may also include selectable switches for activating certain features of the account or to set individual preferences, settings, and security levels for different devices or features of the account. An individual such as the account holder or an account administrator may enable or disable tokens to dynamically control devices that are linked to the account information, without affecting the original account information. Thus, the disclosed embodiments provide, among other things, enhanced security for electronic account information management and communication, while eliminating the need to modify original account information—a problem with traditional account information management systems.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
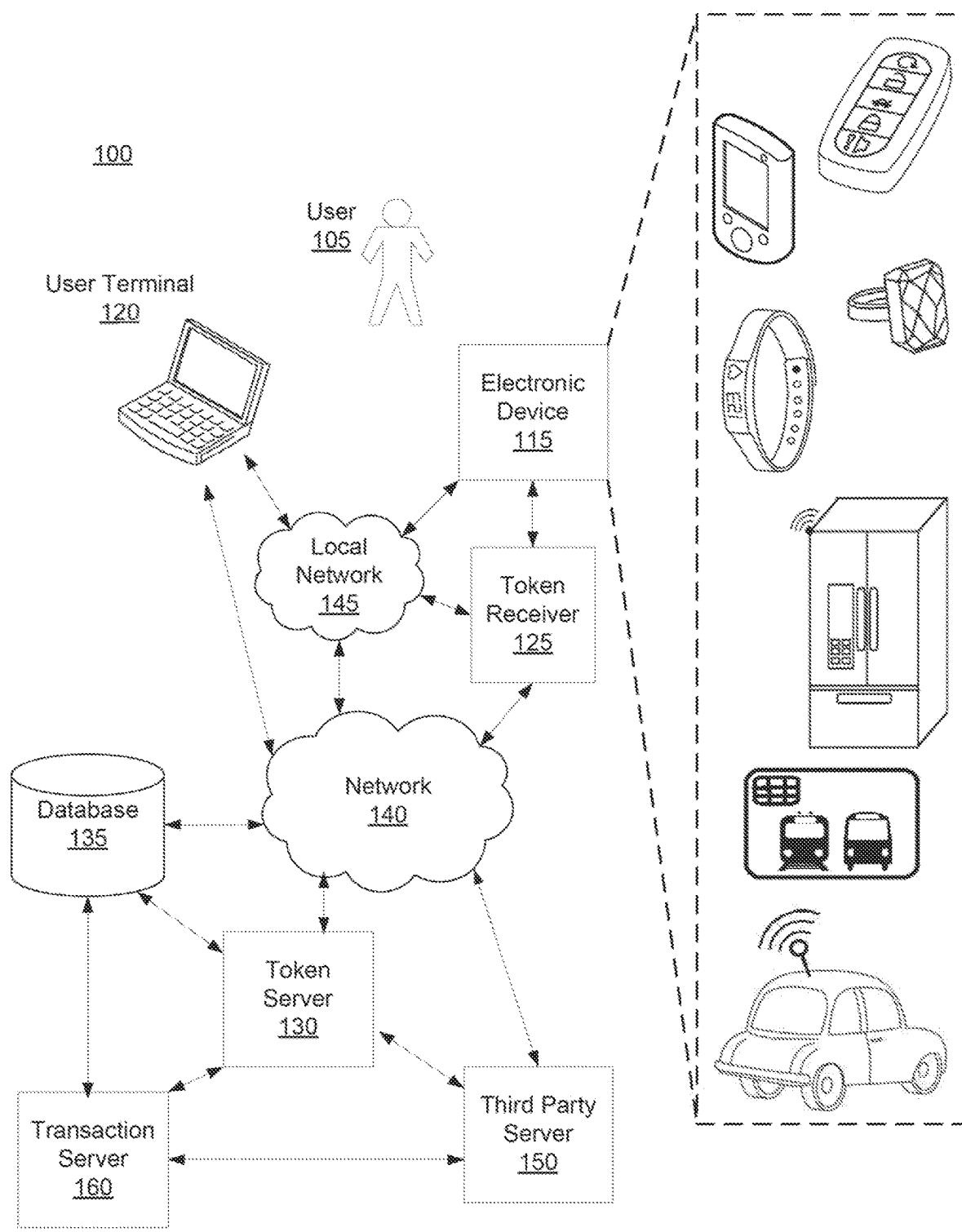
FIG. 1 is a diagram of an exemplary system that may be used to manage electronic tokens for account information sources, consistent with disclosed embodiments.

FIG. 1 shows a diagram of an exemplary system 100 that may be configured to perform one or more processes for managing electronic tokens for account transaction devices. The components and arrangements shown in FIG. 1 are not intended to limit the disclosed embodiments, as the components used to implement the disclosed processes and features may vary.

In accordance with disclosed embodiments, system 100 may electronic device 115, user terminal 120, token receiver 125, token server 130, database 135, network 140, local network 145, third party server 150, and transaction server 160. Other components known to one of ordinary skill in the art may be included in system 100 to gather, process, transmit, receive, and provide information used in conjunction with the disclosed embodiments.

Electronic device 115 and/or terminal device 120 may include computerized systems or devices that are used for transactions associated with an account. The account transaction devices may be associated with a user 105. In some embodiments, user 105 is associated with one or more accounts, such as an identification account, a security access account, a membership account, a credit card account, a debit card account, a checking or savings account, a gift card account, or any other type of account that can be identified using account number or ID.

Electronic device 115 may be a personal computing device such as, for example, a mobile device with computing ability, a tablet, smartphone, wearable device such as Google Glass™ or smart watches, a notebook computer, a medical ID bracelet, a chip such as a flash drive, a wristband for an attraction or resort such as a Disney® MagicBand™, or any combination of these computers and/or affiliated components. In one embodiment, electronic device 115 may be a mobile computer device that is operated by user 105 who is associated with at least one account. In some embodiments, electronic device 115 is an electronic device capable of storing and transmitting account information, such as an electronic token associated with the account. As shown in FIG. 1, electronic device 115 may include, in some embodiments, a smart phone, a wearable device such as an electronic fitness bracelet, or an electronic key such as a wireless car key.

In some embodiments, electronic device 115 may comprise any type of device capable of receiving, storing, and transmitting an electronic token. Some non-limiting examples may include "Internet-of-Things"-type devices, jewelry with embedded electronics, "smart" appliances such as refrigerators, transit cards, and automobiles or vehicles. In some embodiments, "smart" clothing such as shoes or jackets may include circuitry capable of storing and transmitting one or more tokens. While the exemplary embodiments are described as using wireless transmission circuitry for communicating electronic tokens, those of ordinary skill in the art will recognize that electronic tokens can be transmitted using one or more other data transmission means, such as magnetic stripe and reader, wired transmission, and optical transmission including infrared, barcode/QR code, or optical light transmission.

User terminal 120 may comprise one or more computerized devices configured to provide account information via network 140 using an application such as a web browser. User terminal 120 may be a computer-based system including computer system components, desktop computers, workstations, tablets, hand held computing devices, memory devices, and/or internal network(s) connecting the components.

Token receiver 125 may comprise one or more devices configured to receive an electronic token from electronic device 115. In some embodiments, token receiver 125 may comprise a wireless receiver or transceiver that receives an electronic token transmitted from electronic device 115, or interrogates electronic device 115 to retrieve an electronic token. In other embodiments, token receiver 125 may comprise a device that receives one or more electronic tokens by means other than wireless transmission, such as a magnetic stripe reader or wired receiver. In some embodiments, token receiver 125 may be built into another device such as a point-of-sale terminal, a security door, a membership sign-in station, or a transit turn-style. In other embodiments, token receiver 125 may comprise a standalone device in communication with another computer or device, such as token server 130.

Token server 130 may include one or more computer-based systems including computer system components, desktop computers, workstations, tablets, hand held computing devices, memory devices, and/or internal network(s) connecting the components. Token server 130 may be owned and/or operated by an entity responsible for issuing and maintaining one or more accounts associated with user 105. In some embodiments, token server 130 is associated with one or more of a membership facility (such as, e.g., a fitness center), a government organization (such as, e.g., a state government or department of motor vehicles), a bank, a credit card company, a hotel, or any other entity that may issue and maintain one or more accounts. In some embodiments, token server 130 may generate and/or manage one or more electronic tokens associated with the accounts. The electronic tokens may include a reference or pointer to account information associated with the account. For example, the electronic token may provide a reference number pointing to a specific account number, without including the actual account number. Thus, devices that store and transmit the electronic tokens may provide for secure transactions without providing sensitive account information.

Database 135 may include one or more memory devices that store data and instructions used to perform one or more features of the disclosed embodiments. Database 135 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. In some embodiments, database 135 may comprise an associative array architecture, such as a key-value storage, for storing and rapidly retrieving large amounts of information about an individual. In some embodiments, database 135 may store information associated with one or more accounts, and electronic token information associated with electronic device 115 and/or user terminal 120.

Network 140 may comprise any type of computer networking arrangement used to exchange data. For example, network 140 may be the Internet, a private data network, virtual private network using a public network, and/or other suitable connection(s) that enables system 100 to send and receive information between the components of system 100. Network 140 may also include a public switched telephone network ("PSTN") and/or a wireless network such as a cellular network, WiFi network, or other known wireless network capable of bidirectional data transmission.

Local network 145 may comprise any type of computer networking arrangement used to exchange data in a localized area, such as WiFi, Bluetooth™, Ethernet, and other suitable network connections that enable components of system 100 to interact with one another and to connect to network 140 for interacting with components in system environment 200. In some embodiments, local network 145 comprises a portion of network 140. In other embodiments, components of system 100 may communicate via network 140, without a separate local network 145.

Third party server 150 may be owned, operated, and/or associated with a third-party entity involved in one or more transactions initiated by user 105 using an account transaction device such as electronic device 115 or user terminal 120. For example, when token server 130 is associated with a bank, third party server 150 may be associated with a merchant, vendor, or another bank associated with another party to a financial transaction other than user 105.

Transaction server 160 may comprise one or more computing systems operated by an entity associated with token server 130. In some embodiments, transaction server 160 may comprise a local or remote computing system that handles transactions that are detokenized by token server 130. In some embodiments, transaction server 160 and third-party server 160 may be the same server, and in other embodiments they may comprise different computing systems operated by different entities. For example, in a mobile payment environment, transaction server 160 may comprise a computing system that processes payment or mobile banking requests that are detokenized by token server 130, and third-party server 150 may comprise a computing system operated by a card issuer, that routes transaction requests between merchants and token server 130. In some embodiments, transaction server 160 may approve or deny requests to provide different types of information, such as identity and credential information, financial information, access information, and any other type of information that an individual or organization may wish to restrict to certain recipients.

Figure 2:
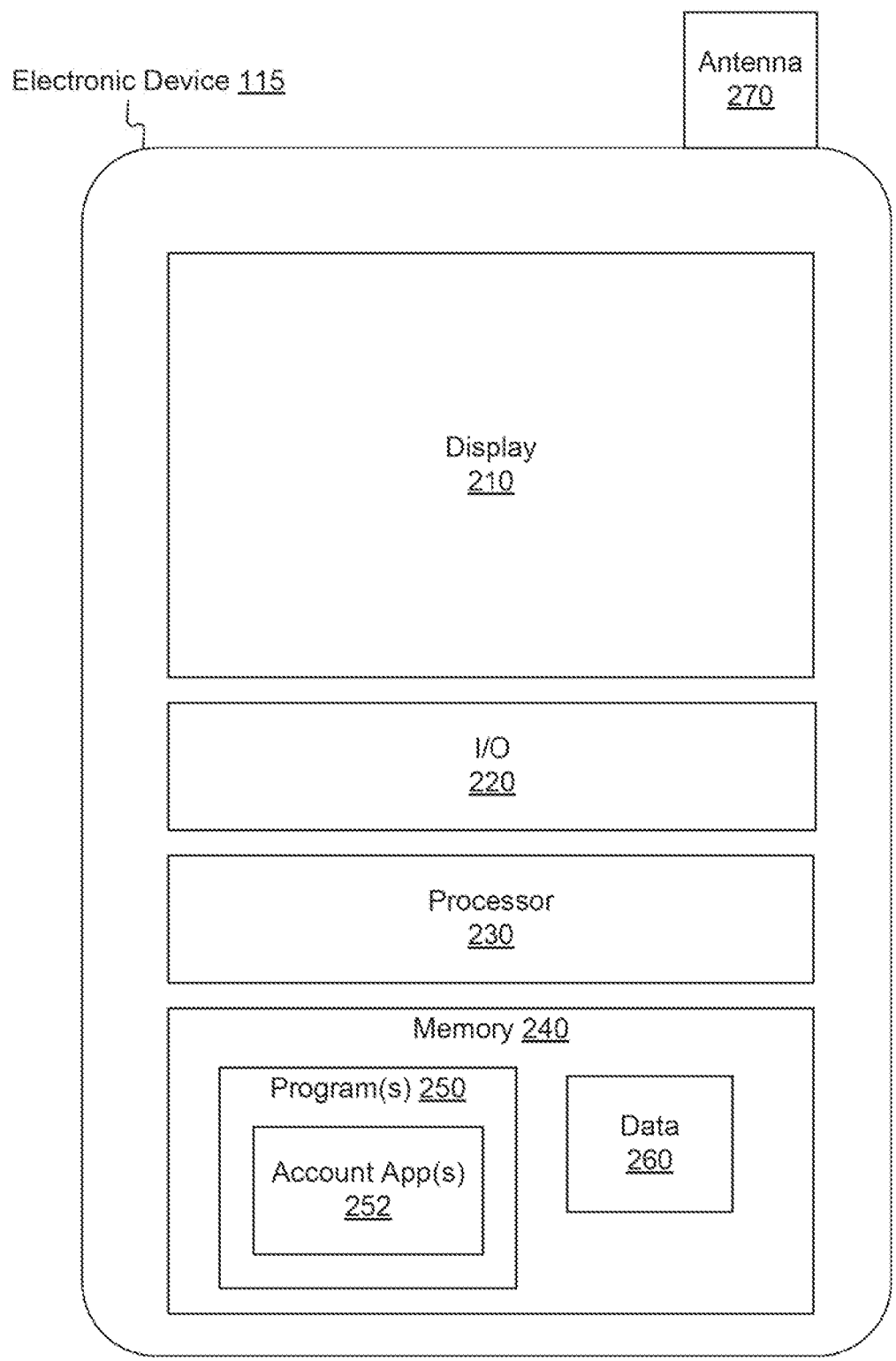
FIG. 2 is a diagram of an electronic device, consistent with disclosed embodiments.

FIG. 2 shows a diagram of an exemplary electronic device 115, consistent with disclosed embodiments. Electronic device 115 can include any type of mobile device capable of receiving, storing, and/or providing account token(s) in the disclosed methods. In some embodiments, electronic device 115 is a mobile personal computing device such as a smartphone, mobile phone, tablet computer, smartwatch, smart glasses, and any other known or future format of portable electronic computing device. In some embodiments, electronic device 115 is a device that has a primary purpose other than performing general computing tasks, yet possesses sufficient computing power and components to store and provide account token(s). Examples of such embodiments may include an electronic car key, a wearable fitness device having a transceiver, a security door fob, an electronic account card, or any other portable electronic device having at least a memory and a wireless transceiver. As previously discussed, in some embodiments electronic device 115 may comprise any type of device capable of receiving, storing, and transmitting an electronic token. Some non-limiting examples may include "Internet-of-Things"-type devices, jewelry with embedded electronics, "smart" appliances such as refrigerators, transit cards, and automobiles or vehicles. In some embodiments, "smart" clothing such as shoes or jackets may include circuitry capable of storing and transmitting one or more tokens. While the exemplary embodiments are described as using wireless transmission circuitry for communicating electronic tokens, those of ordinary skill in the art will recognize that electronic tokens can be transmitted using one or more other data transmission means, such as magnetic stripe and reader, wired transmission, and optical transmission including infrared, barcode/OR code, or optical light transmission.

As shown in FIG. 2, electronic device 115 may include a display 210, input/output ("I/O") devices 220, one or more processors 230, memory 240 having stored thereon one or more programs 250, such as account app 252, and also storing data 260, and may further include a transceiver 270.

Display 210 may include one or more known devices such as, for example, one or more LED indicator lights, a segmented LED display, an LCD screen, an Organic LED (OLED) screen, or any other type of display capable of providing information.

I/O devices 220 may include one or more devices that allow electronic device 115 to receive input from user 105 and provide feedback to user 105. I/O devices 220 may include, for example, one or more buttons, switches, speakers, microphones, or touchscreen panels. In some embodiments, I/O devices 220 may be manipulated by user 105 to input information into mobile device 115. For example, when electronic device 115 is a smartphone, I/O devices 220 may include physical buttons on the smartphone, a microphone, a speaker, touchscreen, camera, or sensor. As another example when electronic device 115 is a car key, I/O devices 220 may include buttons on the car key such as the lock, unlock, and panic buttons. As another example, when electronic device 115 is a wearable fitness device such as a Fitbit™ wristband, I/O devices 220 may include physical buttons and an accelerometer shock sensor.

Processor 230 may be one or more known processing devices, such as a microprocessor from the Pentium™ family manufactured by Intel™ or the Turion™ family manufactured by AMD™. Processor 230 may constitute a single core or multiple core processors that executes parallel processes simultaneously. For example, processor 230 may be a single core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc. multiple software processes, applications, programs, etc. In another embodiment, processor 230 may include a multiple-core processor arrangement (e.g., dual, quad core, etc.) configured to provide parallel processing functionalities to allow mobile device 115 to execute multiple processes simultaneously. One of ordinary skill in the art would understand that other types of processor arrangements could be implemented that provide for the capabilities disclosed herein.

Memory 240 may be a volatile or non-volatile, magnetic, semiconductor, tape, optical, removable, non-removable, or other type of storage device or tangible (i.e., non-transitory) computer-readable medium that stores one or more program(s) 250 such as account app 252, and data 260. Data 260 may include, for example, user 105's personal information, one or more electronic tokens associated with one or more accounts, and display settings and preferences. In some embodiments, electronic tokens may include informational items such as, for example, an alphanumeric reference number that points to an account, an account label, account issuance date, account expiration date, account issuer identification, and any other necessary information associated with user 105 and/or an account associated with user 105, without including highly sensitive information such as an actual account number. Thus, the electronic token may include information that points to an account, without providing sensitive account information that, if compromised, would sacrifice the integrity or security of the account.

Program(s) 250 may include operating systems (not shown) that perform known operating system functions when executed by one or more processors. By way of example, the operating systems may include Microsoft Windows™, Unix™, Linux™, Apple™ operating systems, Personal Digital Assistant (PDA) type operating systems, such as Microsoft CE™, or other types of operating systems. Accordingly, disclosed embodiments may operate and function with computer systems running any type of operating system. Mobile device 115 may also include communication software that, when executed by a processor, provides communications with network 140, such as Web browser software, tablet, or smart hand held device networking software, etc. Electronic device 115 may be a device that executes mobile applications for performing operations consistent with disclosed embodiments, such as a tablet or mobile device. In some embodiments, programs 250 may include basic operating logic for performing functions associated with electronic device 115 such as logic for locking and unlocking doors and starting a car (for a car key), tracking fitness data (for a wearable fitness device), detecting a nearby wireless antenna and transmitting stored information (for a security key fob).

Program(s) 250 may include account app(s) 252, such as an app for receiving, storing, transmitting, and managing an electronic token. In some embodiments, account app 252 may include instructions that cause processor 230 to connect to store a received electronic token, recall a stored token from memory, and provide the stored electronic token. In some embodiments, account app 252 may allow user 105 to configure one or more settings associated with the token and/or other tokens. For example, account app 252 may provide access to a control panel user interface, allowing user 105 to activate, deactivate, and configure settings for tokens associated with other electronic devices 115 and user terminals 120.

In some embodiments, electronic device 115 may include one or more sensors (not shown in figure). Sensors may include one or more devices capable of sensing the environment around mobile device 115 and/or movement of mobile device 115. In some embodiments, sensors 280 may include, for example, an accelerometer, a shock sensor, a gyroscope, a position sensor, a microphone, an ambient light sensor, a temperature sensor, and/or a conductivity sensor.

Figure 3:
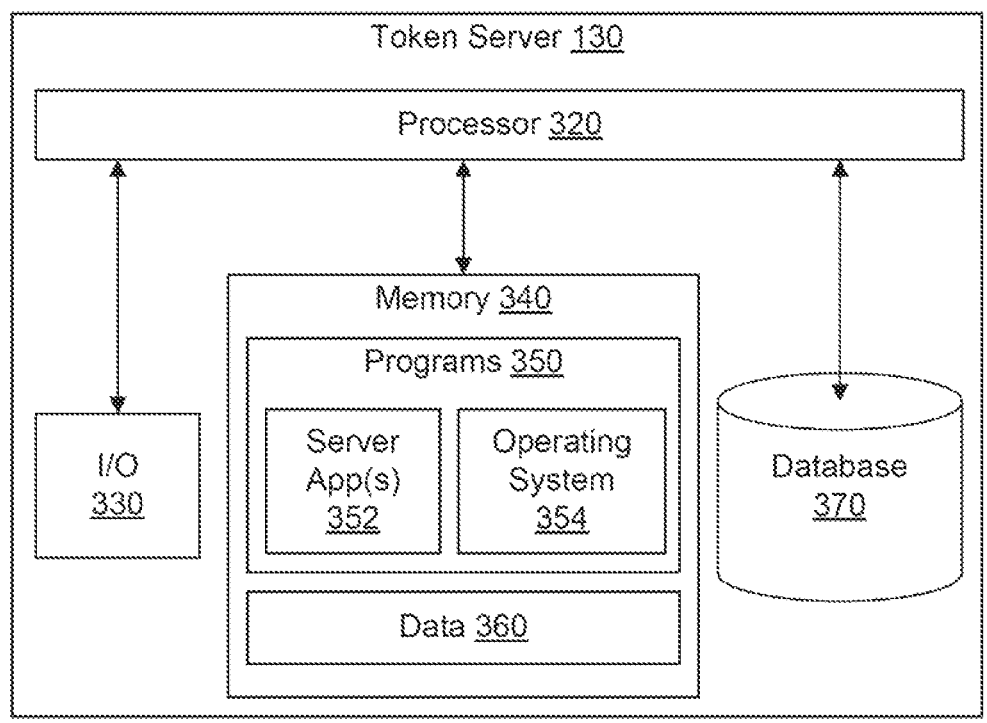
FIG. 3 is a diagram of an exemplary token server, consistent with disclosed embodiments.

FIG. 3 is a diagram of an exemplary token server 130 consistent with disclosed embodiments. As shown, token server 130 may include one or more processor 320, input/output ("I/O") devices 330, memory 340 storing data 360 and programs 350 (including, for example, server app(s) 352 and operating system 354), and a database 370. Token server 130 may be a single server or may be configured as a distributed computer system including multiple servers or computers that interoperate to perform one or more of the processes and functionalities associated with the disclosed embodiments.

Processor 320 may be one or more known processing devices, such as a single- or multiple-core processor that executes parallel processes simultaneously. For example, processor 320 may be a single core processor configured with virtual processing technologies. In certain embodiments, processor 320 may use logical processors to simultaneously execute and control multiple processes. Processor 320 may implement virtual machine technologies, or other known technologies to provide the ability to execute, control, run, manipulate, store, etc. multiple software processes, applications, programs, etc. In another embodiment, processor 320 may include a multiple-core processor arrangement (e.g., dual core, quad core, etc.) configured to provide parallel processing functionalities to allow token server 130 to execute multiple processes simultaneously. One of ordinary skill in the art would understand that other types of processor arrangements could be implemented that provide for the capabilities disclosed herein.

Token server 130 may also include one or more I/O devices 330 that may comprise one or more interfaces for receiving signals or input from devices and providing signals or output to one or more devices that allow data to be received and/or transmitted by token server 130. For example, token server 130 may include interface components that provide interfaces to one or more input devices, such as one or more keyboards, mouse devices, and the like, that enable token server 130 to receive input from an employee of the financial service provider (not shown) or other operator of server 130.

Token server 130 may include one or more storage devices configured to store information used by processor 320 (or other components) to perform certain functions related to the disclosed embodiments. In one example, token server 130 may include memory 340 that includes instructions to enable processor 320 to execute one or more applications, such as server applications, an electronic transaction application, an account status application, network communication processes, and any other type of application or software known to be available on computer systems. Alternatively or additionally, the instructions, application programs, etc. may be stored in an internal database 470 or external storage (not shown) in direct communication with token server 130, such as one or more database or memory accessible over network 140. Database 370 or other external storage may be a volatile or non-volatile, magnetic, semiconductor, tape, optical, removable, non-removable, or other type of storage device or tangible (i.e., non-transitory) computer-readable medium.

In one embodiment, token server 130 may include memory 340 that includes instructions that, when executed by processor 320, perform one or more processes consistent with the functionalities disclosed herein. Methods, systems, and articles of manufacture consistent with disclosed embodiments are not limited to separate programs or computers configured to perform dedicated tasks. For example, token server 130 may include memory 340 that may include one or more programs 350 to perform one or more functions of the disclosed embodiments. Moreover, processor 320 may execute one or more programs located remotely from account information display system 100. For example, token server 130 may access one or more remote programs, that, when executed, perform functions related to disclosed embodiments.

Programs 350 stored in memory 340 and executed by processor(s) 320 may include one or more server app(s) 352 and operating system 354. Server app(s) 352 may incorporate one or more account information apps that cause processor(s) 320 to execute one or more processes related to managing or transmitting account information including, but not limited to, managing one or more electronic account database entries, generate one or more electronic tokens associated with an account, transmit the generated electronic token to an electronic device 115 or terminal device 120, generate one or more interfaces for controlling activation statuses of the generated electronic tokens, and for managing one or more settings for each of the electronic tokens.

Memory 340 and database 370 may include one or more memory devices that store data and instructions used to perform one or more features of the disclosed embodiments. Memory 340 and database 370 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Token server 130 may also be communicatively connected to one or more remote memory devices (e.g., remote databases (not shown)) through network 140 or a different network. The remote memory devices may be configured to store information and may be accessed and/or managed by token server 130. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Figure 4:
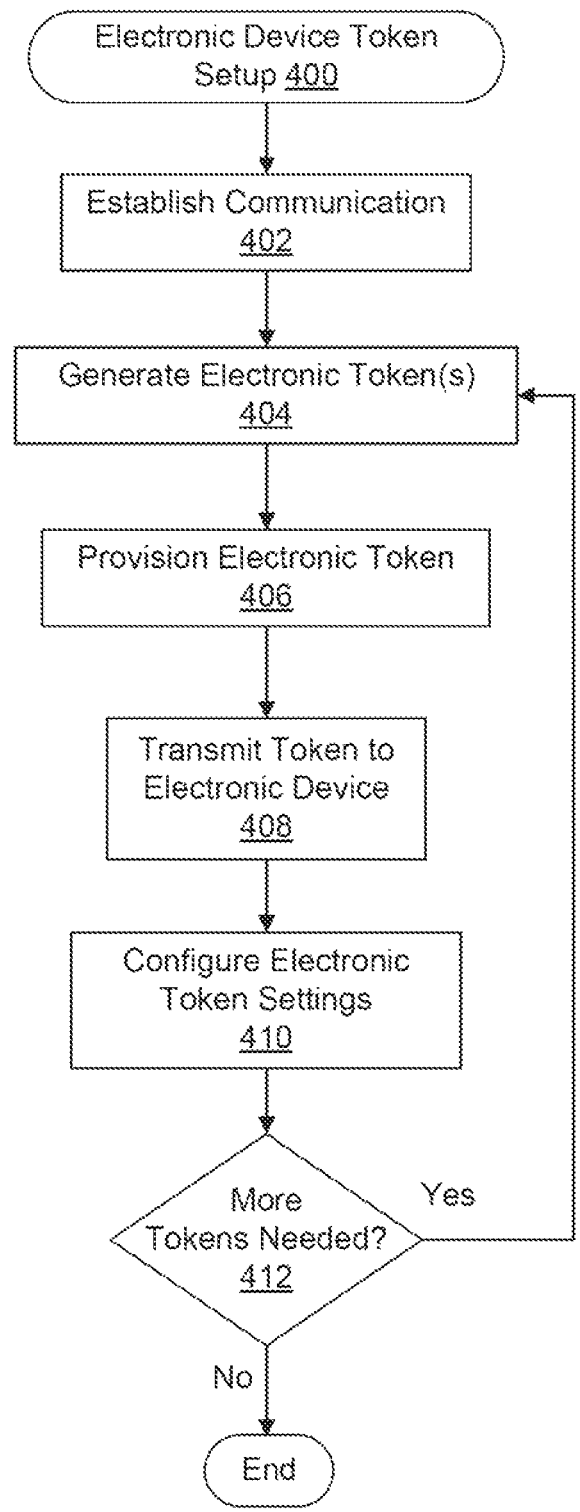
FIG. 4 is a flowchart of an exemplary electronic device token setup process, consistent with disclosed embodiments.

FIG. 4 is a flowchart of an exemplary electronic device token setup process 400. In some embodiments, process 400 may provide electronic device 115 with an electronic token associated with one or more account for user 105. Process 400 is discussed below as being performed by token server 130. In some embodiments, some or all of the steps of process 400 may be performed by one or more processors other than processor 320 of token server 130, such as, for example, electronic device 115, user terminal 120, or any other individual or distributed computing systems (not shown in figures).

In step 402, token server 130 may establish communication with electronic device 115. In some embodiments, token server 130 may initiate communication with electronic device 115 over a wireless communication link such as network 140 or local network 145. Electronic device 115 may include one or more controls for entering a "pairing mode," to receive and accept an invitation from token server 130 to establish a bidirectional communication link.

In step 404, token server 130 may generate one or more electronic tokens for the electronic device 115 in communication with token server 130. In some embodiments, the electronic token may comprise an encrypted or unencrypted file including one or more of a software application or data to be utilized by another software application. The electronic token may include data associated with and specific to the account associated with user 105 and electronic device 115. In some embodiments, the electronic token is devoid of any identifying or sensitive information associated with user 105 or the account, such as user 105's name or identifying information, or the account number or security code(s). Instead, the electronic token may include data that refers to user 105 or an account associated with user 105. The reference data may allow token server 130 to determine the sensitive information associated with the account or user 105, when the electronic token is received at token server 130 from the designated device.

In step 406, token server 130 may provision the generated one or more electronic tokens to the electronic device 115. In some embodiments, token server 130 may store a relationship between the generated electronic tokens and the account information, such as a database entry identifying the generated electronic token(s) as being pointers to specific account information. Token server 130 may also receive and store authentication data from electronic device 115, for later authenticating an electronic token received from the electronic device 115.

In step 408, token server 130 may transmit the provisioned electronic token(s) to the electronic device 115 via, for example, network 140 and/or local network 145. Once received, electronic device 115 may store the electronic token, or install the electronic token (not shown in figure).

In step 410, token server 130 may configure settings associated with the electronic token(s). In some embodiments, token server 130 may generate one or more user interfaces, such as a graphical user interface control panel, allowing user 105 to configure one or more settings associated with the electronic token provisioned to electronic device 115. In some embodiments, settings may include one or more of time restrictions, limits, thresholds, security levels, authorized users, and any other preferences, rules, or restrictions configurable by user 105 depending on the type of account, the needs of user 105, and the needs and capabilities of the entity managing the account. In some embodiments, settings may also include acceptable/unacceptable geographic locations to complete transactions with the token. For example, a token setting may indicate that the token cannot be used to complete a transaction in a particular city, and any transactions associated with that token would be denied if they originate from the disallowed city. Similarly, a setting may indicate that the token is permitted for use only in a particular city, and any transactions originating from outside that city would be denied. As another example, token settings may allow a user to restrict certain tokens for domestic or international use, and disallow transactions that are outside the allowed country. In some embodiments, token settings may indicate a particular merchant name, merchant category, or merchant code that is allowed/disallowed in association with a particular token.

In step 412, token server 130 may determine whether additional electronic tokens are required for the additional electronic devices 115 and/or additional accounts. In some embodiments, token server 412 may request an indication from user 105 as to whether additional electronic devices 115 are to be linked to the account. In some embodiments, token server 130 may automatically determine that additional electronic tokens are needed, such as when additional electronic devices 115 are in communication with token server 130 (from step 402) that do not have any provisioned electronic token. If additional electronic tokens are needed ("Yes" in step 412), then process 400 may return to step 404. In some embodiments, process 400 may return to step 402 if additional electronic tokens are needed and additional electronic devices 115 are not yet in communication with token server 130.

If no additional electronic tokens are needed ("No" in step 412), then process 400 may end.

Figure 5:
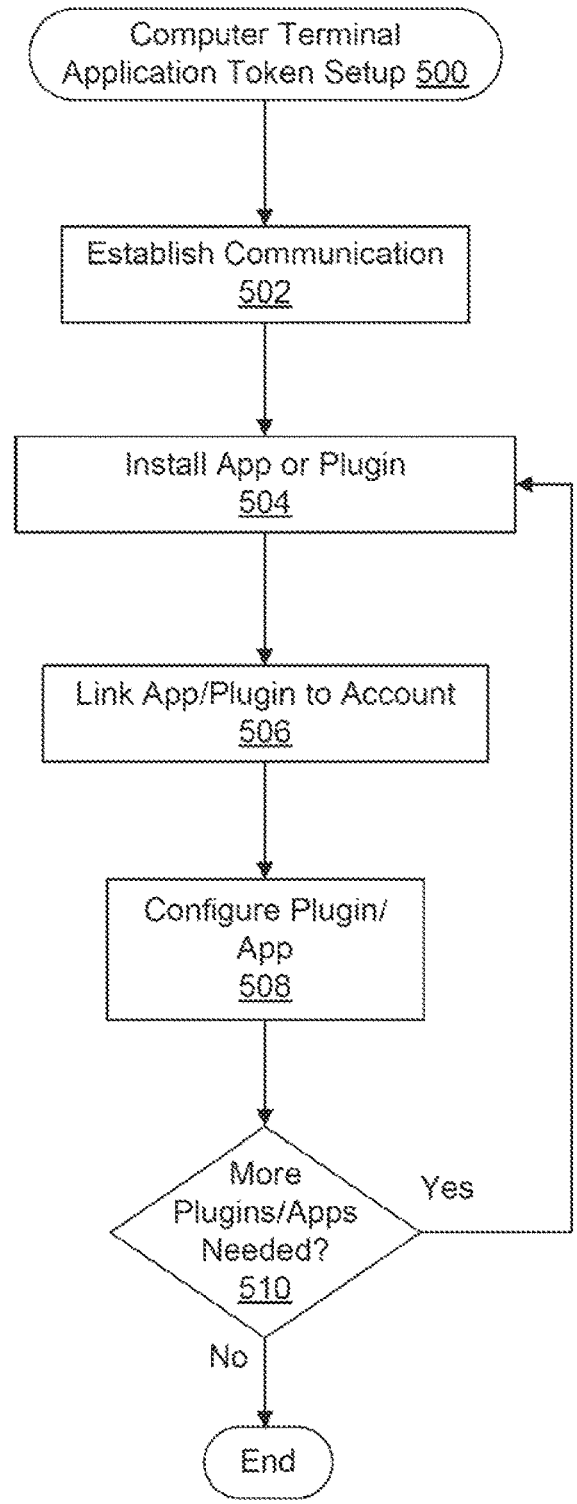
FIG. 5 is a flowchart of an exemplary computer terminal application token setup process, consistent with disclosed embodiments.

FIG. 5 is a flowchart of an exemplary computer terminal application electronic token setup process 500. Process 500 may involve setting up an application running on terminal device 120, such as a web browser application on a desktop or laptop computer. Process 500 may be used to setup a web browser on user terminal 120 to transmit one or more dynamic electronic tokens to complete a transaction over network 140. For example, when the account is a payment account, a plugin or app associated with a web browser application on user terminal 120 may generate an electronic token identifying user 105, user terminal 120, and/or the account, and provide the electronic token to third party server 150, e.g., a third party server 150 associated with a merchant, for completing a purchase transaction. Third party server 150 may then provide the electronic token to token server 130, at which point token server 130 may determine the account associated with the electronic token, and authorize the payment transaction. As described below, process 500 is performed primarily by terminal device 120. In some embodiments, process 500 may be performed by one or more other processing devices, such as token server 130 and/or electronic device 115.

In step 502, terminal device 120 may establish communication with token server 130 and access an application such as server app 352, causing terminal device 120 to display one or more graphical user interfaces including a control panel. In some embodiments, process 500 may proceed without displaying the control panel.

In step 504 terminal device 120 may install an application received from token server 130, such as an app or plugin for a web browser running on terminal device 120. The plugin or app may generate one or more electronic tokens dynamically for completing electronic transactions that require authentication with token server 130 and/or the transmission of account information from token server 130 to third party server 150.

In step 506, the installed app/plugin may be linked to an account managed by token server 130. In some embodiments, terminal device 120 may transmit information identifying the particular installation of the plugin/app to token server 130. Token server 130 may store the identifying information in a database entry identifying a relationship between the account and account information to the plugin/app installed on terminal device 120. Thereafter, token server 130 may determine the particular account and account information required to complete a transaction, upon receiving a token generated by the plugin/app during an authenticated transaction.

In step 508, terminal device 120 may configure the plugin/app, such as by prompting user 105 to enter one or more settings for the plugin/app, or receiving one or more settings from token server 130. In some embodiments, a plugin/app may be designated for individual websites. For example, a plugin/app may generate tokens for completing transactions on predetermined websites, such as a certain shopping website or certain travel booking website. The plugin/app may be configured to generate and provide tokens that token server 130 only accepts for the designated website. If a data breach occurs and information from the website is compromised, token server 130 would decline any transaction initiated using the token from another website, thereby preventing fraudulent activity.

In step 510, terminal device 120 may determine whether there are additional computer applications that require plugins or linking to token server 130. For example, if terminal device 120 has multiple web browsers installed (such as Microsoft® Internet Explorer® Google® Chrome®, and Mozilla® Firefox®), terminal device 120 may prompt user 105 for input regarding whether additional web browsers should be linked to token server 130. If additional plugins are required for additional computer applications ("Yes" in step 510), then process 500 may return to step 504. If no additional computer applications require plugins ("No" in step 510), then process 500 may end.

Figure 6A:
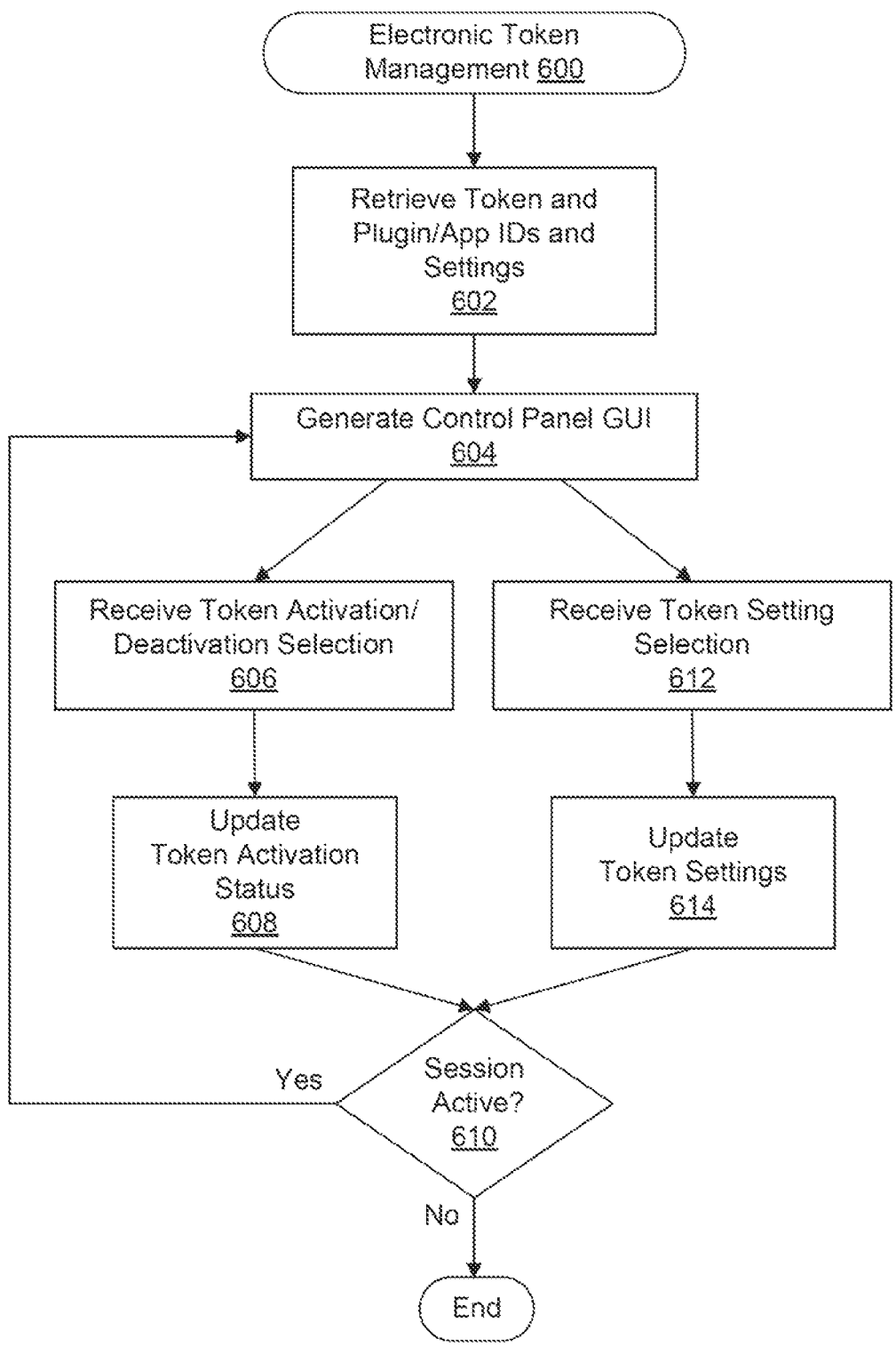
FIG. 6A is a flowchart of an exemplary token management process, consistent with disclosed embodiments.

FIG. 6A is a flowchart of an exemplary electronic token management process 600. Process 600 may provide user 105 or another authorized individual to manage electronic tokens associated with an account at both an individual level and at a bulk level. As previously discussed, the electronic tokens provide a pointer to account information that is recognizable only by token server 130, and the electronic tokens can be transmitted or exchanged during a transaction, without divulging the actual sensitive account information. Therefore, individual tokens can be enabled, disabled, or subject to certain restrictions without having any effect on the actual account information stored at token server 130. Sensitive account information is not exchanged during a transaction initiated by user 105, thereby increasing security, virtually eliminating many risks associated with electronic transactions involving account information, and allowing individualized control of electronic token sources without requiring any changes to the sensitive account information. For example, if an electronic device 115 having an electronic token associated therewith is lost or stolen, the token for the electronic device 115 can be individually disabled in the control panel application, without requiring cancellation or replacement of the sensitive account information. Furthermore, if the electronic token is stolen and transmitted from another, unauthorized device, token server 130 may decline the transaction by determining that the electronic token was transmitted from an unknown or unauthorized device.

For discussion, process 600 is described herein as being performed primarily by token server 130. In some embodiments, electronic device 115 or terminal device 120 may include an interface for accessing and viewing a graphical user interface generated by token server 130. In some embodiments, terminal device 120 or electronic device 115 may include an application configured to receive data from memory or from storage associated with token sever 130, and generate a control panel user interface, consistent with disclosed embodiments.

For simplicity, the term "token" as used herein may refer to both the electronic tokens provisioned to individual electronic devices and to plugins/apps installed in terminal devices.

In step 602, token server 130 may retrieve identifications and settings for all electronic tokens, plugins, and apps associated with a particular account, such as those linked and configured during processes 400 and 500. In some embodiments, token server 130 may retrieve data from a repository such as database 370 or memory 340, or a remote data storage configured to store and organize large quantities of data (not shown in figures).

In step 604, token server 130 may generate data for displaying a control panel graphical user interface. In some embodiments, token server 130 may generate a graphical depiction of each token or plugin associated with the account, such as an icon or a line of text. Token server 130 may also generate one or more graphical user interface controls for controlling an activation status of each token. In some embodiments, token server 130 may also generate one or more depictions or controls associated with settings for each token. For example, token server 130 may generate one or more icons, symbols, or labels indicating whether a particular token or plugin is limited for use with certain third parties, such as a particular store, merchant, facility, or other third party that may conduct transactions involving account data. In some embodiments, token server 130 may generate one or more graphical controls for activating or deactivating some or all of the tokens or plugins simultaneously. For example, the control panel GUI may include a master switch that activates or deactivates all tokens and plugins simultaneously, regardless of their current activation status. Such a master switch may be selected when user 105 desires to freeze the entire account and prevent any activity on the account. In other embodiments, the control panel GUI may include one or more switches for activating or deactivating groups of two or more tokens or plugins simultaneously. Tokens or plugins associated with each group switch may be determined automatically by token server 130 and/or manually by user 105. For example, control panel GUI may include a first group switch that activates/deactivates "all electronic devices," and a second group switch that activates/deactivates "all plugins/apps." Group and master switches may be customized or reconfigured according to the needs of user 105 and predefined rules programmed in token server 130."

In step 606, token server 130 may receive a selection of a control for activating or deactivating a particular token. For example, user 105 may attempt to activate or deactivate one or more particular tokens, a group of tokens (including, e.g., via a group switch), or all tokens (including, e.g., via the master switch). Token server 130 may determine the tokens associated with the selected control (not shown in figure).

In step 608, token server 130 may update one or more database entries associated with the activation status of the affected tokens, to indicate whether the affected tokens are activated or deactivated based on the selected control. For example, if token server 130 determines that a wearable fitness device token should be deactivated based on a corresponding control input received in step 606, then token server 130 may update and store a status of the wearable fitness device token as "inactive." Thereafter, token server 130 would decline any transaction initiated using the wearable fitness device token. In some embodiments, token server 130 may communicate the updated status to the electronic device 115 or terminal device 120. In such embodiments, electronic device 115 or terminal device 120 may proactively refuse to initiate additional transactions until the token status is changed back to "active." In some embodiments, deactivation may cause deletion of the token from the respective electronic device 115 or terminal device 120. Thus, user 105 or an authorized individual may have the ability to control individual devices linked to a single account using a single unified control panel interface, without having any effect on the sensitive account information stored with the institution managing the account.

In step 610, token server 130 may determine whether the control panel session is still active, such as by determining whether the control panel GUI is still open in an application or browser window. If so ("Yes" in step 610), then process 600 may return to 604, in which an updated control panel GUI is generated and displayed. If token server 130 determines that the session is no longer active ("No" in step 610), then in some embodiments process 600 may end.

In step 612, token server 130 may receive a selection of one or more token setting controls. For example, token server 130 may determine that user 105 selected an icon or switch associated with a particular token or group of tokens, that the icon or switch has changed a restriction or rule associated with the affected token or group of tokens. In some embodiments, token server 130 may generate and display one or more additional user interfaces corresponding to the selected setting or rule, to receive additional details regarding the requested setting update. For example, if user 105 selects a switch for limiting a spending limit on a car key token, token server 130 may generate and display an additional user interface to request a new spending limit for the car key token. Thereafter, token server 130 may only complete transactions initiated using the car key at or below the spending limit for the car key token. As another example, if token server 130 determines that user 105 wants to restrict a car key token for usage during certain times of day, then token server 130 may generate and display an interface for receiving selection of valid time periods for using the affected token or group of tokens.

In step 614, token server 103 may update one or more database entries associated with the settings of the affected tokens, to reflect the new or updated settings associated with the selected tokens. Thereafter, token server 130 may query the stored settings when presented with a transaction initiated by the affected token(s), to determine whether the transaction should proceed depending on the rules and restrictions in the stored settings. In some embodiments, token server 130 may provide the selected settings to the electronic device 115 or terminal device 120 associated with the affected token, to allow the electronic device 115 or terminal device 120 to govern the initiation of future transactions based on the settings. Thus, using the disclosed embodiments, user 105 may set individual rules and restrictions for different devices or web browsers, without affecting the restrictions or settings associated with the overall account. For example, when the account is a spending account, user 105 may set individual spending limits for devices and web browsers that are different from one another and different (yet lower) than an overall spending limit set by the issuing entity of the spending account. As another example, a secure facility access account may allow access to a room or building during business hours, but user 105 may set restrictions on different devices associated with the access account, to prevent access at times, including times within business hours, without affecting the overall account settings.

After completing step 614, process 600 may proceed to step 610, to determine whether the control session is still active.

Figure 6B:
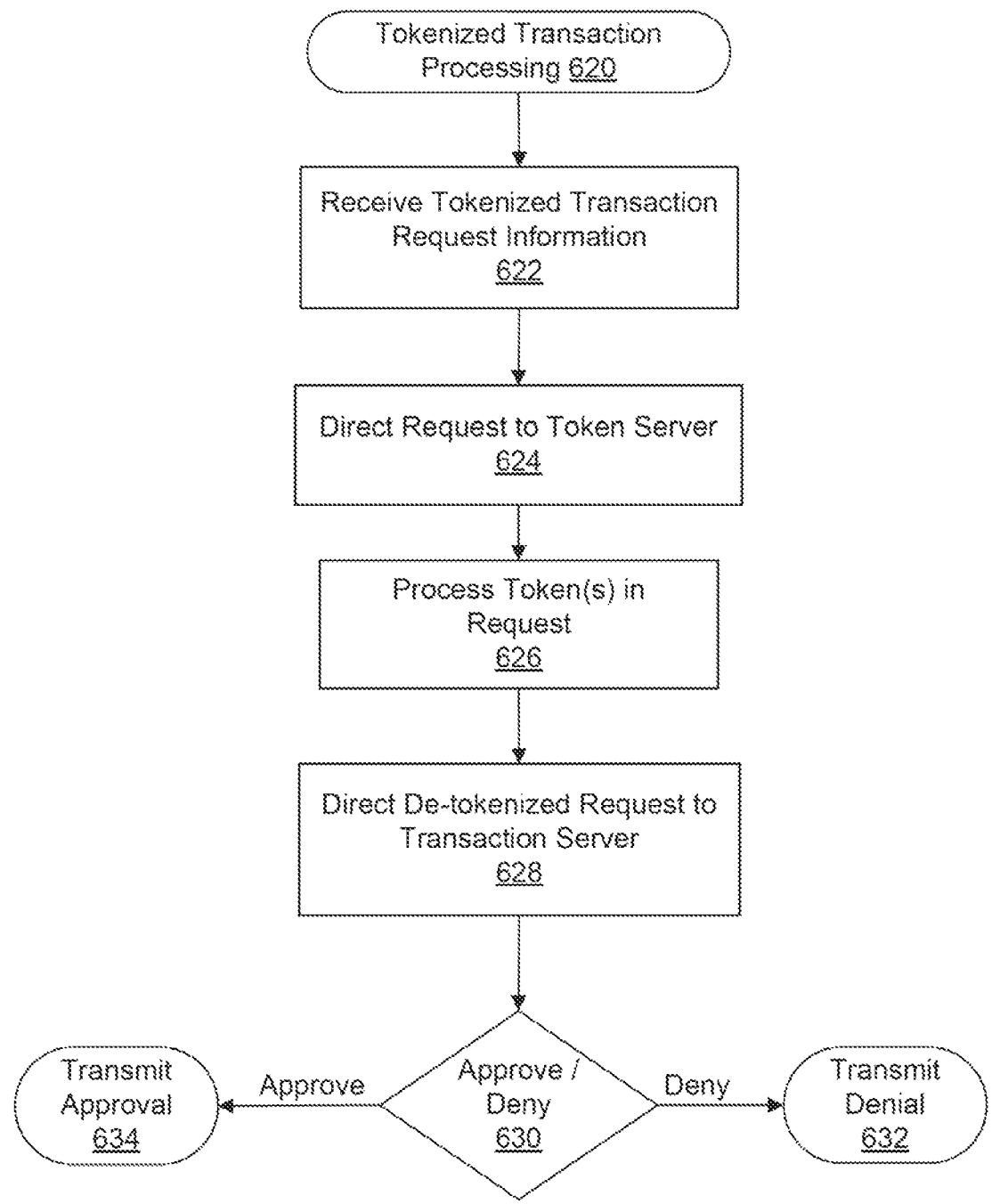
FIG. 6B is a flowchart of an exemplary tokenized transaction processing process, consistent with disclosed embodiments.

FIG. 6B is a flowchart of an exemplary tokenized transaction processing process 620, consistent with disclosed embodiments. Process 620 may be performed by one or more processors and/or computing devices such as token server 130, transaction server 160, third party server 150, and other computing devices not shown in the figures.

In step 622, a server may receive information for a tokenized transaction request. In some embodiments, a third party server 150, such as a credit card issuer server, may receive a transaction request from a merchant. The third party server 150 may first analyze the transaction request, identify a token in the request, and identify a token server most likely associated with the token (steps not shown). The third party server 159 may also direct the tokenized request or information associated with the request to the token server 130 (step 624).

In step 626, a server such as token server 130 may process the received request information in order to determine whether the token is activated or deactivated, determine whether any settings associated with the token affect the transaction approval or denial, detokenize the transaction request, etc. Step 626 is described in further detail with regard to FIG. 6C.

In step 628, token server 130 may direct the detokenized transaction request to a server such as transaction server 160, to approve or deny the request. In some embodiments, transaction server may manage information associated with an account toward which the transaction request is directed.

In step 630, transaction server 160 may determine whether to approve or deny the requested transaction. In some embodiments, the transaction may include a purchase transaction, and transaction server 160 may determine whether the cardholder's credit limit is exceeded or remaining balance is insufficient. In other embodiments, the transaction may include a request to access a secure door, and transaction server 160 may determine whether or not the individual associated with the detokenized request is authorized to access the secure area. If transaction server 160 determines that the request should be denied ("deny" in step 630), then in step 632 transaction server 160 may transmit information associated with the denial to the computer where the transaction request originated, and/or to another computer designated in the transaction request. If transaction server 160 determines that the request should be approved ("approve" in step 630), then in step 634 transaction server 160 may transmit information associated with the approval to the computer where the transaction request originated, and/or to another computer designated in the transaction request.

Figure 6C:
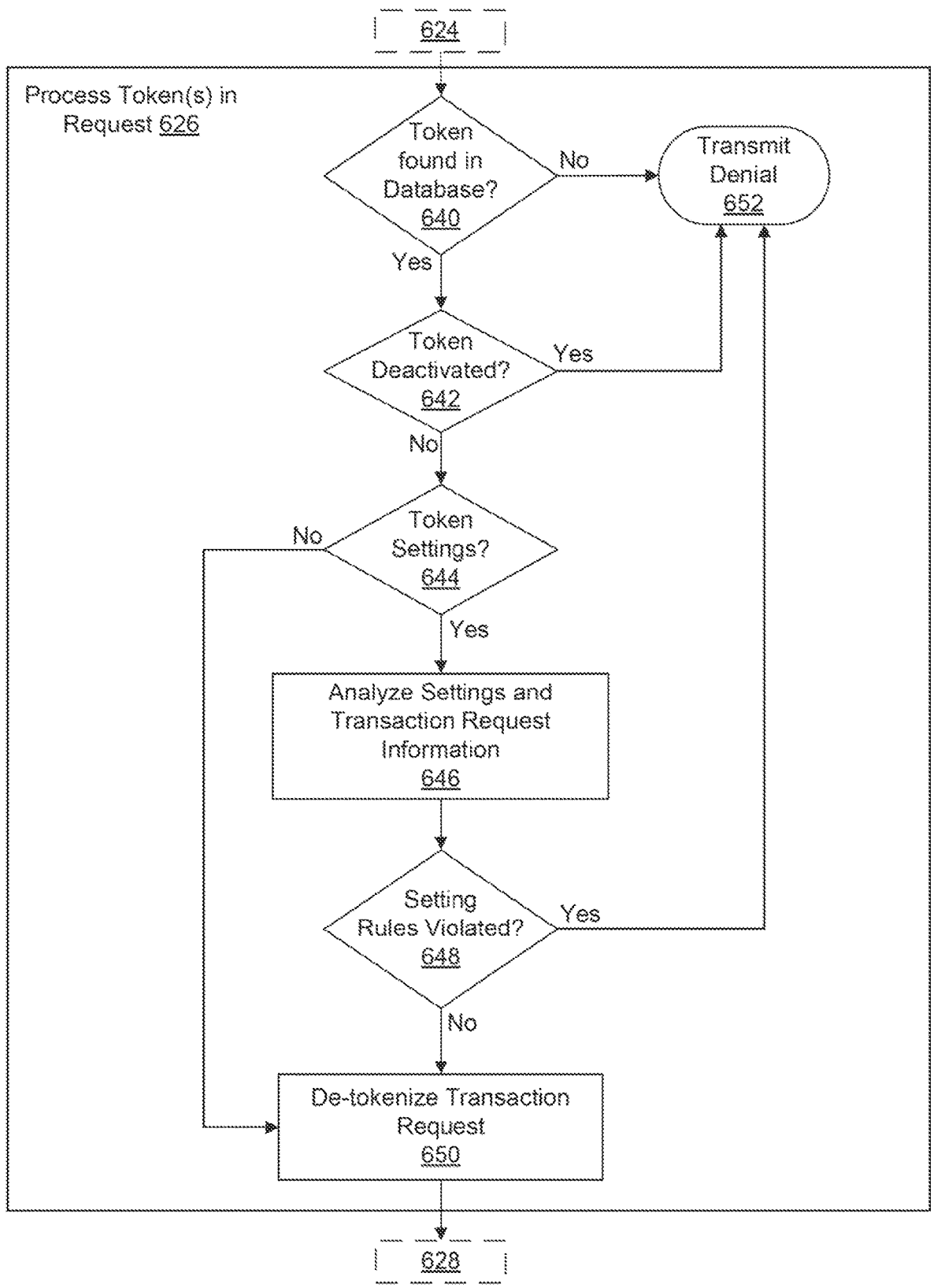
FIG. 6C is a flowchart of an exemplary process for processing tokens in a request, consistent with disclosed embodiments.

FIG. 6C is a flowchart of an exemplary process for processing tokens in a request 626, consistent with disclosed embodiments. In some embodiments, token server 130 may perform the substeps associated with step 626, and in other embodiments the substeps may be distributed among one or more other servers or processing devices. For discussion purposes, the substeps of step 626 are described as being performed by token server 130. As shown, step 626 may occur between steps 624 and 628 of process 620 (FIG. 6B).

In step 640, token server 130 may identify a token in the received transaction request or information associated with the transaction request, and may determine whether the identified token corresponds to stored information for one or more accounts. For example, token server 130 may search a database such as database 130, to determine whether the token matches stored token information.

If token server 130 determines that the token is associated with any stored records and therefore is not found ("no" in step 640), then token server 130 may deny the transaction and transmit information associated with the denial in step 652.

If token server 130 determines that the token is found ("yes" in step 640), then in step 642 token server 130 may query one or more records associated with the token to determine whether the token has been deactivated. If the token is deactivated ("yes" in step 642), then token server 130 may deny the transaction and transmit information associated with the denial in step 652. If the token is active and has not been deactivated ("no" in step 642), then the process may proceed to step 644.

In step 644, token server 130 may determine whether the token has associated settings. As previously discussed, token settings may include, for example, restrictions on spending limits, times that the token is valid, valid geographic locations for initiating transactions using the token, and restricted users for the token.

If token server 130 determines that there are no token settings associated with the token ("no" in step 644), then the process may proceed directly to step 650, in which the token server 130 de-tokenizes the transaction request, thereby associating sensitive account or identity information with the transaction request. Process 600 may then proceed to step 628, in which token server 130 transmits the de-tokenized request to transaction server 160 for approval or denial.

Returning to step 644, if one or more token settings are stored in association with the token ("yes" in step 644), then the process may proceed to step 646, in which token server 130 analyzes the transaction request information and the token settings. In some embodiments, token server 130 may compare information included in the transaction request to the token settings. For example, if the transaction request is for a purchase, and if the token settings include a maximum transaction amount, such as $100, token server 130 may determine whether information in the transaction request indicates that the purchase is $100 or less. As another example, if the transaction request is for access to a secure door, and the token settings include a restricted time period for access, then token server 130 may determine whether a timestamp of the transaction request is within the time period.

After analyzing the transaction request information and token settings, in step 648 may determine whether at least one token setting rule is violated by the transaction request information, such as an exceeded purchase amount, a timestamp outside a permitted time period, or any other violation associated with the token settings. If token server 130 determines that a token setting rule is violated ("yes" in step 648), then token server 130 may deny the transaction and transmit information associated with the denial in step 652.

If token server 130 determines that no token setting rules are violated ("no" in step 648), then token server 130 may de-tokenize the transaction request (step 652), thereby associating sensitive account or identity information with the transaction request. Token server 130 may then transmit the de-tokenized request to transaction server 160 (step 628) for approval or denial.

In some embodiments, token server 130 and/or transaction server 160 are located remotely from the location where the transaction request originates. For example, in conventional commerce systems, point-of-sale devices located at merchants transmit transaction request information to token server 130 and/or transaction server 160 located remotely from the point-of-sale device.

In other embodiments, token server 130 and/or transaction server 160 may be located at the location where the transaction request originates. For example, in some security access systems, token server and/or transaction server 160 may be located in the geographic region where the token receiver 125 and/or security access doors are located. As another example, some public transportation systems may have token server 130 and/or transaction server 160 located in a location of one or more turnstiles for accessing the public transportation services.

Figure 7:
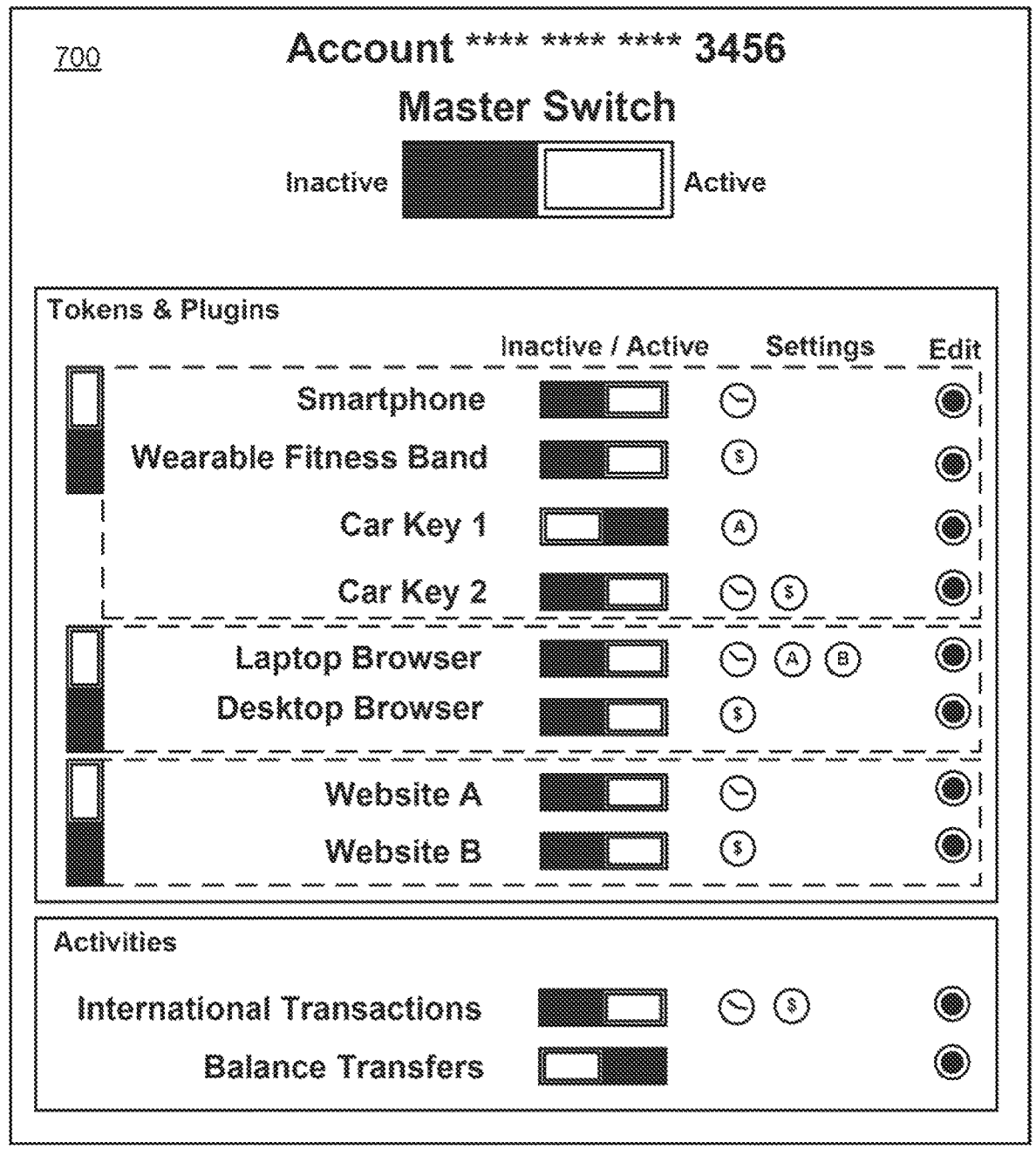
FIG. 7 is an illustration of a graphical user interface with an example of a token control panel, consistent with disclosed embodiments.

FIG. 7 is an illustration of a graphical user interface including an example of a control panel 700. Control panel 700 may include a plurality of controls, switches, menus, icons, and other graphical elements that provide user 105 with a comprehensive indication of the status and settings associated with all devices and plugins/apps that are configured to conduct account transactions. Additionally, control panel 700 may provide statuses and controls associated with features or settings associated with the account.

In the example shown in FIG. 7, control panel 700 provides controls for an account ending in number 3456. Control panel 700 may include a master switch for activating or deactivating the entire account. In the example shown, control panel 700 is organized into two sections for "Tokens & Plugins" and "Activities." In some embodiments, the layout and configuration of control panel 700 may be configurable by user 105 or another authorized individual, depending on the needs of user 105 and the entity managing user 105's account. The "Tokens & Plugins" portion of control panel 700 may include controls and settings for account transaction devices, including electronic devices 115 and plugins installed on user terminals 120. As shown, a group switch is provided for bulk activation/deactivation of "Smartphone," "Wearable Fitness Band," "Car Key 1," and "Car Key 2." Another group switch is provided for "Laptop Browser," and "Desktop Browser." A third group switch is provided for "Website A," and "Website B," discuss later. Selection of a group switch may cause token server 130 to update an activation status of all electronic devices 115 in the group, regardless of the current status. In some embodiments, deactivated electronic devices or plugins may appear in a different color or in a lighter color, to distinguish from activated devices or plugins (not illustrated in figure).

Each electronic device 115 and user terminal 120 plugin may have an individual activation switch. In the example shown, Smartphone, Wearable Fitness Band, and Car Key 2 are activated, and Car Key 1 is deactivated. Selection of individual activation switches may cause token server 130 to update an individual activation status of the associated device or plugin.

Plugins for "Laptop Browser" and "Desktop Browser" may include individual activation switches, as well as a group switch, depending on the preferences of user 105 or the predetermined configuration set by token server 130.

In some embodiments, token server 130 may provide individual switches and/or settings for websites that associated with the account. For example, when a plugin/app is associated with one or more particular websites, control panel 700 may provide a switch for disabling individual websites. In the example shown, the Laptop Browser plugin is associated with websites A and B (shown by the circled letters under the Settings column). If Website A is deactivated via the individual switch for Website A, then the Laptop Browser plugin may continue generating electronic tokens for conducting transactions over Website B, but not Website A. Additionally, any other electronic tokens or plugins associated with Website A may cease to complete transactions.

In some embodiments, control panel 700 may include one or more switches or settings for activities and features associated with an account. In the example shown, the "Activities" box provides switches and settings for "International Transactions" and "Balance Transfers." Using the unified control panel 700, user 105 may activate and deactivate different aspects of the account, other than the devices and methods of transmitting account information. In the example shown, control panel 700 may allow user 105 to prevent any international transactions by a single switch, or toggle the activation of balance transfers. The types of features displayed in control panel 700 may vary depending on the type of account, features associated with the account, the needs of user 105, and the capabilities of token server 130 and the entity managing the account.

As shown in FIG. 7, next to the activation switches are settings icons, indicative of the types of settings that have been configured with respect to each electronic device 115, user terminal 120 plugin, website, or account feature. Settings may include, for example, time restrictions (illustrated by a clock icon), spending limit and other monetary restrictions (illustrated by a "$" icon), or restrictions to specific third parties, such as specific websites, merchants, facilities, locations, or other configurable location and entity-based restrictions (illustrated by the "A" and "B" icons representing Website A and Website B). In some embodiments, selection of any of the settings icons may provide additional information and controls for modifying the specific settings (not shown in figure). In some embodiments, each line item in control panel 700 may include an "Edit" button, illustrated at the right of control panel 700, for allowing user 105 or another authorized individual to edit any settings associated with the respective electronic device 115, user terminal 120 plugin, website/location/third party, or account activity. In some embodiments, user 105 may configure specific security settings for each item in control panel 700. For example, user 105 may configure token server 130 to require a PIN number for any transactions initiated using Car Key 1, or a specific password for Laptop Browser 1. Thus, control panel 700 may provide user 105 with comprehensive options for personalizing and customizing many different aspects of their experience using the account, without affecting or accessing any sensitive information. Moreover, control panel 700 provides settings and information all aspects of the account, including the account transaction devices, in a unified graphical user interface.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for facilitating token management, the system comprising:
one or more processors and memories storing instructions that, when executed by the one or more processors, cause operations comprising:
generating a plurality of electronic tokens associated with an account, the plurality of electronic tokens comprising data sufficient for conducting a transaction and being provisioned to a plurality of electronic devices;
generating data for a user interface of a user device, the user interface comprising (i) a first group toggle switch corresponding to activating a first restriction on a first token group of two or more electronic tokens provisioned to respective electronic devices of a first device group, (ii) a second group toggle switch corresponding to activating a second restriction on a second token group of two or more electronic tokens provisioned to respective electronic devices of a second device group, (iii) first device-specific control elements respectively corresponding to application of the first restriction to individual tokens of the first token group, and (iv) second device-specific control elements respectively corresponding to application of the second restriction to individual tokens of the second token group, such that:
(a) user selection of the first group toggle switch triggers a first prompt requesting a first input related to the first restriction on the first token group; and
(b) user selection of the second group toggle switch triggers a second prompt requesting a second input related to the second restriction on the second token group;
after the first restriction is applied to the first token group in one or more databases in connection with receiving the first input, receiving, via a network, information for a transaction request associated with the account, the transaction request information comprising a first token of the first token group and not comprising other tokens of the first token group;
analyzing the received transaction request information to determine whether the restriction applied to the first token group has been violated based on the transaction request information despite the transaction request information not comprising the other tokens of the first token group; and
responsive to a determination that the first restriction applied to the first token group is violated, transmitting an indication that the transaction request is denied.

2. The system of claim 1, the operations further comprising:
responsive to a determination that no restrictions associated with the first token is violated, detokenizing the transaction request to generate a detokenized transaction request and routing the detokenized transaction request to a transaction server.

3. The system of claim 1, wherein the first token comprises an alphanumeric string that points to the account, and the alphanumeric string does not comprise an account number of the account.

4. The system of claim 1, wherein the restriction comprises at least one of a given restriction on valid geographic locations for initiating transactions using a token of the first token group, a given restriction on times when tokens of the first token group are valid, or a given spending limit associated with the first token group.

5. The system of claim 1, wherein the first restriction comprises an indication of at least one of a merchant name, merchant category, or merchant code for which tokens of the first token group are valid.

6. The system of claim 1, wherein transmitting the indication that the transaction request is denied comprises, responsive to a determination that (i) the first token is in a deactivated state for an electronic device and (ii) the transaction request information was received from the electronic device, transmitting the indication that the transaction request is denied.

7. The system of claim 1, wherein the first token is associated with at least one of a wearable device, an electronic key, an appliance, or a vehicle.

8. A method comprising:
generating electronic tokens associated with an account;
generating data for a user interface of a user device, the user interface comprising:
(i) a first toggle switch corresponding to application of a first restriction on a first token group of electronic tokens such that the first restriction is applied to the first token group in connection with a first input corresponding to user selection of the first toggle switch; and
(ii) a second toggle switch corresponding to application of a second restriction on a second token group of electronic tokens such that the second restriction is applied to the second token group in connection with a second input corresponding to user selection of the second toggle switch;
receiving the first input in connection with the user selection of the first toggle switch and applying the first restriction to the first token group in one or more databases;
after the first restriction is applied to the first token group, receiving, via a network, information for a transaction request associated with the account, the transaction request information comprising a first token of the first token group;
determining, based on the transaction request information, that the first restriction has been violated despite the transaction request information not comprising one or more other tokens of the first token group; and
responsive to the determination that the first restriction is violated, transmitting an indication that the transaction request is denied.

9. The method of claim 8, wherein the user interface comprises (i) the first toggle switch corresponding to application of the first restriction on the first token group, (ii) the second toggle switch corresponding to application of the second restriction on the second token group, and (iii) device-specific control elements respectively corresponding to application of the first or second restriction to individual tokens of the first or second token group.

10. The method of claim 8, wherein the first restriction comprises an indication of at least one of a merchant name, merchant category, or merchant code for which tokens of the first token group are valid.

11. The method of claim 8, wherein receiving the transaction request information comprises receiving, from the user device, the transaction request information via a network after the first restriction is applied to the first token group.

12. The method of claim 8, wherein transmitting the indication that the transaction request is denied comprises, responsive to a determination that (i) the first token is in a deactivated state for an electronic device and (ii) the transaction request information was received from the electronic device, transmitting the indication that the transaction request is denied.

13. The method of claim 8, wherein the first token is associated with at least one of a wearable device, an electronic key, an appliance, or a vehicle.

14. One or more non-transitory computer-readable media storing instructions that, when executed by one or more processors, cause operations comprising:
  generating electronic tokens associated with an account;
  generating data for a user interface of a user device, the user interface comprising:
  (i) a first control element corresponding to application of a first restriction on a first token group of electronic tokens such that the first restriction is applied to the first token group in connection with a first input corresponding to user selection of the first control element;
  (ii) a second control element corresponding to application of a second restriction on a second token group of electronic tokens such that the second restriction is applied to the second token group in connection with a second input corresponding to user selection of the second control element; and
  (iii) device-specific control elements respectively corresponding to application of the first or second restriction to individual tokens of the first or second token group;
  after the first restriction is applied to the first token group in one or more databases in connection with receiving the input, receiving, via a network, information for a transaction request associated with the account, the transaction request information comprising a first token of the first token group;
  determining, based on the transaction request information, whether the first restriction has been violated despite the transaction request information not comprising one or more other tokens of the first token group; and
  based on a determination that the first restriction is violated, transmitting an indication that the transaction request is denied.

15. The one or more non-transitory computer-readable media of claim 14, wherein transmitting the indication that the transaction request is denied comprises, responsive to a determination that (i) the first token is in a deactivated state for an electronic device and (ii) the transaction request information was received from the electronic device, transmitting the indication that the transaction request is denied.

16. The one or more non-transitory computer-readable media of claim 14, wherein the user interface comprises (i) a first toggle switch corresponding to activation of the first restriction on the first token group and (ii) a second toggle switch corresponding to activation of the second restriction on the second token group.

17. The one or more non-transitory computer-readable media of claim 14, wherein the first token is associated with at least one of a wearable device, an electronic key, an appliance, or a vehicle.

* * * * *